United States Patent
DeCesare et al.

(10) Patent No.: US 9,343,883 B2
(45) Date of Patent: May 17, 2016

(54) RAINTIGHT COMPRESSION CONNECTOR AND RAINTIGHT COMPRESSION COUPLER FOR SECURING ELECTRICAL METALLIC TUBING OR RIGID METALLIC CONDUIT

(71) Applicant: Bridgeport Fittings, Inc., Stratford, CT (US)

(72) Inventors: Christopher W. DeCesare, Naugatuck, CT (US); Lawrence J. Smith, Stamford, CT (US)

(73) Assignee: BRIDGEPORT FITTINGS, INC., Stratford, CT (US)

( * ) Notice: Subject to any disclaimer, the term of this patent is extended or adjusted under 35 U.S.C. 154(b) by 261 days.

(21) Appl. No.: 14/068,663

(22) Filed: Oct. 31, 2013

(65) Prior Publication Data

US 2014/0265321 A1  Sep. 18, 2014

Related U.S. Application Data

(60) Provisional application No. 61/783,375, filed on Mar. 14, 2013.

(51) Int. Cl.
  *H02G 3/06* (2006.01)
(52) U.S. Cl.
  CPC .................... *H02G 3/0616* (2013.01)
(58) Field of Classification Search
  CPC .... H02G 3/0616; H02G 3/065; H02G 3/0658
  USPC ................. 285/151.1, 154.1, 149.1
  See application file for complete search history.

(56) References Cited

U.S. PATENT DOCUMENTS

| | | | |
|---|---|---|---|
| 1,186,812 | A | 6/1916 | McFerran |
| 1,327,106 | A | 1/1920 | Leahy |
| 1,488,175 | A | 3/1924 | Strandell |
| 1,772,536 | A | 8/1930 | Cox |
| 1,796,806 | A | 3/1931 | Pearson |
| 1,809,582 | A * | 6/1931 | Church ............ H02G 3/06 285/154.1 |
| 1,809,583 | A | 6/1931 | Church |
| 1,888,343 | A | 11/1932 | Bohlman et al. |
| 2,139,413 | A | 10/1933 | Kreidel |
| 2,100,796 | A | 11/1937 | Church |
| 2,158,757 | A | 5/1939 | Max |
| 2,233,214 | A | 2/1941 | Neil |
| 2,255,673 | A | 9/1941 | McDermott |

(Continued)

FOREIGN PATENT DOCUMENTS

CN  102011904 A  4/2011

*Primary Examiner* — David E Bochna
(74) *Attorney, Agent, or Firm* — Ware, Freesola, Maguire & Barber LLP

(57) ABSTRACT

A raintight compression connector has a connector body with first and second portions and a bore extending therethrough. The first portion is dimensioned for receipt of an EMT or RMC conduit. A gland nut threads onto the first portion and a split compression ring contacts the gland nut so as to secure the connector body to the conduit. An upper sealing ring makes sealing contact with the conduit; and a wedge-shaped sealing ring is positioned in the bore of first portion against a shoulder formed in the first portion. The sealing ring contacts a terminating face of the conduit so as to pliably deform around the face so as to form a watertight seal. The second portion is securable to an enclosure. A coupler with two portions similar to the first portion of the connector has corresponding components to form a watertight seal with two conduits.

23 Claims, 8 Drawing Sheets

(56) References Cited

U.S. PATENT DOCUMENTS

| | | | |
|---|---|---|---|
| 2,448,888 A * | 9/1948 | Hynes | F16L 19/086 285/341 |
| 2,474,319 A | 6/1949 | Jacques | |
| 2,503,169 A | 4/1950 | Phillips | |
| 2,651,529 A | 7/1951 | Wayman | |
| 2,761,705 A | 9/1956 | Kreidel | |
| 2,833,569 A | 5/1958 | Budnick | |
| 2,836,438 A | 5/1958 | Turnipseed | |
| 3,275,347 A | 9/1966 | William | |
| 3,393,931 A | 7/1968 | Wurzburger | |
| 3,647,934 A | 3/1972 | Hurtt | |
| 3,667,783 A | 6/1972 | Sotolongo | |
| 3,794,362 A | 2/1974 | Mooney | |
| 3,801,131 A | 4/1974 | Appleton | |
| 3,907,335 A | 9/1975 | Burge et al. | |
| 3,972,547 A | 8/1976 | Itoya | |
| 4,019,762 A | 4/1977 | Eidelberg et al. | |
| 4,030,741 A | 6/1977 | Fidrych | |
| 4,145,075 A | 3/1979 | Holzmann | |
| 4,250,348 A | 2/1981 | Kitagawa | |
| 4,376,873 A * | 3/1983 | Lackinger | H02G 3/0616 285/354 |
| 4,508,466 A | 4/1985 | Dennis | |
| 4,515,991 A | 5/1985 | Hutchison | |
| 4,547,623 A | 10/1985 | Van Brunt et al. | |
| 4,549,755 A * | 10/1985 | Kot | H02G 3/0658 285/151.1 |
| 4,606,562 A | 8/1986 | Saraceno | |
| 4,608,454 A * | 8/1986 | Lackinger | H02G 3/0683 285/343 |
| 4,676,533 A | 6/1987 | Gerondale | |
| 4,877,270 A | 10/1989 | Phillips | |
| 4,915,427 A | 4/1990 | Zahuranec | |
| 4,983,784 A | 1/1991 | Whitlock | |
| 5,028,078 A | 7/1991 | Schwarz et al. | |
| 5,037,140 A | 8/1991 | Anderson | |
| 5,068,494 A | 11/1991 | Bolante | |
| 5,208,427 A | 5/1993 | Couto et al. | |
| 5,230,536 A | 7/1993 | Rider et al. | |
| 5,393,109 A | 2/1995 | Gumpel | |
| 5,466,890 A | 11/1995 | Stagnitti | |
| 5,621,191 A | 4/1997 | Norris et al. | |
| 5,951,327 A | 9/1999 | Marik | |
| 6,073,976 A | 6/2000 | Schmidt et al. | |
| 6,268,565 B1 | 7/2001 | Daoud | |
| 6,641,180 B2 | 11/2003 | Udhoefer | |
| 6,702,336 B1 | 3/2004 | Chelchowski et al. | |
| 6,835,088 B2 * | 12/2004 | Shemtov | H02G 3/088 439/272 |
| 6,840,550 B2 | 1/2005 | Sundholm | |
| 6,851,728 B2 | 2/2005 | Minami | |
| 6,988,746 B2 * | 1/2006 | Olson | F16L 19/12 285/151.1 |
| 7,002,077 B2 | 2/2006 | Pyron | |
| 7,080,859 B1 * | 7/2006 | Gretz | F16L 19/10 285/151.1 |
| 7,390,027 B2 * | 6/2008 | Kiely | F16L 19/061 285/154.1 |
| 7,438,327 B2 * | 10/2008 | Auray | F16L 19/063 285/151.1 |
| 7,841,630 B1 * | 11/2010 | Auray | F16L 5/06 285/151.1 |
| 7,976,070 B2 | 7/2011 | Kiely | |
| 8,129,633 B1 * | 3/2012 | Shemtov | F16L 19/061 285/382.7 |
| 8,474,877 B2 * | 7/2013 | Smith | H02G 3/065 285/154.1 |
| 2004/0090067 A1 * | 5/2004 | Pridham | F16L 19/065 285/342 |
| 2005/0194785 A1 * | 9/2005 | Shemtov | F16L 19/0212 285/382.7 |
| 2008/0143103 A1 | 6/2008 | Kiely | |

\* cited by examiner

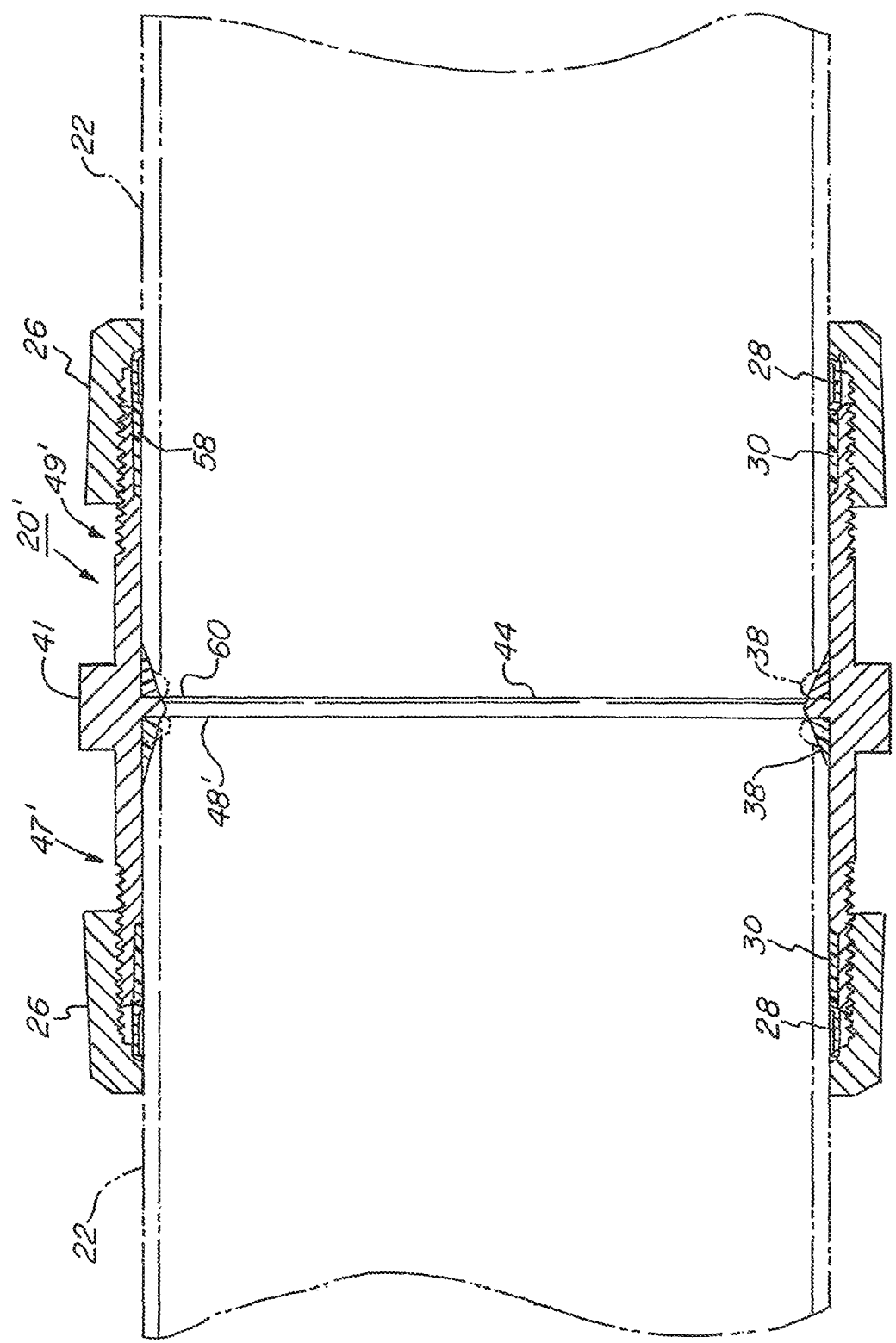

RAINTIGHT COMPRESSION CONNECTOR AND RAINTIGHT COMPRESSION COUPLER FOR SECURING ELECTRICAL METALLIC TUBING OR RIGID METALLIC CONDUIT

CROSS-REFERENCE TO RELATED APPLICATION

This application claims priority under 35 USC §119 to U.S. Provisional Patent Application No. 61/783,375 filed on Mar. 14, 2013, whose entire contents are hereby incorporated by reference in their entirety.

FIELD OF THE INVENTION

This invention is directed to a raintight compression connector for securing electrical metallic tubing (EMT), or Rigid Metallic Conduit (RMC), to an electrical enclosure and to a raintight compression coupler for securing two EMT's or RMC's to each other.

BACKGROUND OF THE INVENTION

Various types of raintight electrical connectors have been developed for securing electrical metallic tubing to an electrical enclosure, such as a junction box or the like. Corresponding raintight electrical couplers have also been developed for securing two EMT's or RMC's to each other. Existing connectors and couplers may use a sealing gland for preventing water intrusion between the outer surface of the EMT or RMC and an electrical enclosure or other EMT or RMC. It has been observed that existing connectors and couplers may have difficulty maintaining a raintight connection, due to sealing surface imperfections of the EMT or RMC outside diameters, especially with larger diameter trade sizes.

SUMMARY OF THE INVENTION

A raintight compression connector or coupler according to an embodiment of the present invention incorporates an upper sealing ring and a wedge-shaped, elastomeric sealing ring secured against a shoulder (conduit stop) of the fitting, which in combination effectively accommodates outside diameter or surface imperfection tolerance variations in the EMT or RMC (collectively referred to as conduit), surface imperfections in the EMT or RMC, as well as a skewed terminating face of the EMT or RMC (not at right angles to the longitudinal axis of the EMC or RMC) and thereby provides a raintight compression connector or coupler.

The embodiment of the present invention is a raintight compression connector comprising a connector body having a first portion and a second portion and a bore extending through the first portion and the second portion, the first portion dimensioned for receipt of a conduit in said bore, the first portion having a first end and a second end, a gland nut having internal threads dimensioned for threaded engagement with first external threads formed in the first portion at the first end, a split compression ring dimensioned for contact with the gland nut so as to secure the gland nut and the first portion of the connector body to the conduit when the conduit is inserted into the first portion, an upper sealing ring dimensioned for contact with the first portion of the connector body so as to make sealing contact with the conduit when the conduit is inserted into the first portion, and a wedge-shaped sealing ring positioned in the bore of first portion against a shoulder formed in the first portion at the second end thereof, the wedge-shaped sealing ring dimensioned to contact a terminating face of the conduit so as to pliably deform around the conduit terminating face so as to form a watertight seal between said conduit terminating face and the shoulder, wherein the connector body has an outer flange and wherein the second portion of the connector body is dimensioned for receipt of a knockout gasket, the second portion having second external threads dimensioned for receipt of a locknut for securing the knockout gasket positioned around a knockout hole in an electrical enclosure between said outer flange and the electrical enclosure, thereby forming a raintight seal therewith.

Another embodiment of the present invention is the raintight compression connector as described above, wherein the wedge-shaped sealing ring is glued to the shoulder.

A further embodiment of the present invention is the raintight compression connector as described above, wherein the wedge-shaped sealing ring is further glued to an inner peripheral wall of the first portion of the connector body.

A still further embodiment of the present invention is the raintight compression connector as described above, wherein the wedge-shaped sealing ring is glued to an inner peripheral wall of the first portion of the connector body.

Another embodiment of the present invention is the raintight compression connector as described above, wherein the wedge-shaped sealing ring is seated against the shoulder and an inner peripheral wall of the first portion of the connector body.

A further embodiment of the present invention is the raintight compression connector as described above, wherein the wedge-shaped sealing ring is formed from an elastomeric material.

A further embodiment of the present invention is the raintight compression connector as described above, wherein the split compression ring is formed from spring steel.

A still further embodiment of the present invention is the raintight compression connector as described above, wherein the upper sealing ring is formed from polyethylene.

Another embodiment of the present invention is the raintight compression connector as described above, wherein the outer flange has flat portions dimensioned for gripping.

A further embodiment of the present invention is the raintight compression connector as described above, wherein the connector body is fabricated from a die cast zinc alloy.

A still further embodiment of the present invention is the raintight compression connector as described above, wherein the knockout gasket is formed from a washer having two faces, with a pliable material on at least a portion of both faces.

Another embodiment of the present invention is a raintight compression coupler comprising a connector body having a first portion and a second portion and a bore extending through the first portion and the second portion, the first portion dimensioned for receipt of a first conduit in said bore, the first portion having a first end and a second end and the second portion dimensioned for receipt of a second conduit in said bore, the second portion having a first end and a second end, a first gland nut having internal threads dimensioned for threaded engagement with first external threads formed in the first portion at its first end, a first split compression ring dimensioned for contact with the first gland nut so as to secure the first gland nut and the first portion of the connector body to the first conduit when the first conduit is inserted into the first portion, a first upper sealing ring dimensioned for contact with the first portion of the connector body so as to make sealing contact with the first conduit when the first conduit is inserted into the first portion, and a first wedge-shaped sealing ring positioned in the bore of the first portion against a shoulder formed at the second end of the first portion, the first sealing ring dimensioned to contact a terminating face of the first conduit so as to pliably deform around the first conduit terminating face so as to form a watertight seal between said first conduit terminating face and the first shoulder, a second gland nut having internal threads dimensioned for threaded engagement with second external threads formed in the second portion at its first end, a second split compression ring dimensioned for contact with the second gland nut so as to secure the second gland nut and the second portion of the connector body to the second conduit when the second conduit is inserted into the second portion, a second upper sealing ring dimensioned for contact with the second portion of the connector body so as to make sealing contact with the second conduit when the second conduit is inserted into the second portion, and a second wedge-shaped sealing ring positioned in the bore of the second portion against a shoulder formed at the second end of the second portion, the second wedge-shaped sealing ring dimensioned to contact a terminating face of the second conduit so as to pliably deform around the second conduit terminating face so as to form a watertight seal between said second conduit terminating face and the shoulder.

A further embodiment of the present invention is the raintight compression coupler as described above, wherein the shoulder formed at the second end of the first portion and the shoulder formed at the second end of the second portion is the same shoulder.

Another embodiment of the present invention is the raintight compression coupler as described above, wherein the first wedge-shaped sealing ring is glued to the shoulder formed in the first portion and wherein the second wedge-shaped sealing ring is glued to the shoulder formed in the second portion.

A further embodiment of the present invention is the raintight compression coupler as described above, wherein the first wedge-shaped sealing ring is further glued to an inner peripheral wall of the first portion of the connector body and the second wedge-shaped sealing ring is further glued to an inner peripheral wall of the second portion of the connector body.

A still further embodiment of the present invention is the raintight compression coupler as described above, wherein the first wedge-shaped sealing ring is glued to an inner peripheral wall of the first portion of the connector body and the second wedge-shaped sealing ring is glued to an inner peripheral wall of the second portion of the connector body.

Another embodiment of the present invention is the raintight compression coupler as described above, wherein the first wedge-shaped sealing ring is seated against the shoulder formed in the first portion and wherein the second wedge-shaped sealing ring is seated against the shoulder formed in the second portion.

A further embodiment of the present invention is the raintight compression coupler as described above, wherein the first and second wedge-shaped sealing rings are formed from an elastomeric material.

A still further embodiment of the present invention is the raintight compression coupler as described above, wherein the first and second split compression rings are formed from spring steel.

A further embodiment of the present invention is the raintight compression coupler as described above, wherein the first and second upper sealing rings are formed from polyethylene.

Another embodiment of the present invention is the raintight compression coupler as described above, further comprising an outer flange positioned about the connector body, said outer flange dimensioned for gripping.

A further embodiment of the present invention is the raintight compression coupler as described above, wherein the outer flange has flat portions dimensioned for gripping.

A still further embodiment of the present invention is the raintight compression coupler as described above, wherein the connector body is fabricated from a die cast zinc alloy.

BRIEF DESCRIPTION OF THE DRAWINGS

FIG. 10 is a cross-sectional view of the raintight compression coupler taken along line 10-10 of FIG. 7, showing the EMT's or RMC's and wedge-shaped sealing rings in dashed lines, the latter as deformed by the EMTs or RMC's so as to form a raintight seal therewith.

DETAILED DESCRIPTION

Figure 1:
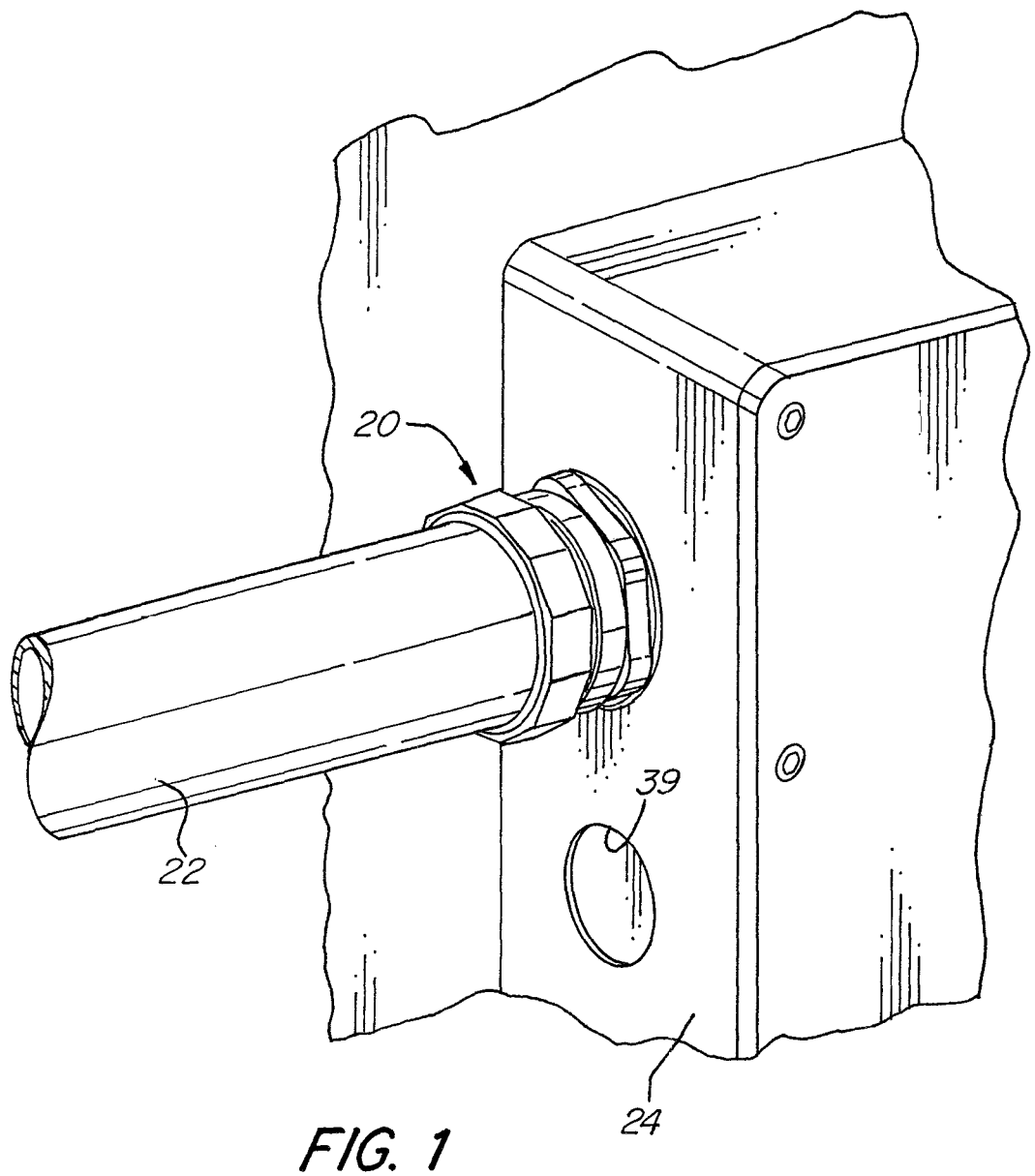
FIG. 1 is a perspective view of the raintight compression connector according to an embodiment of the present invention, the connector attached to an electrical enclosure.
Figure 2:
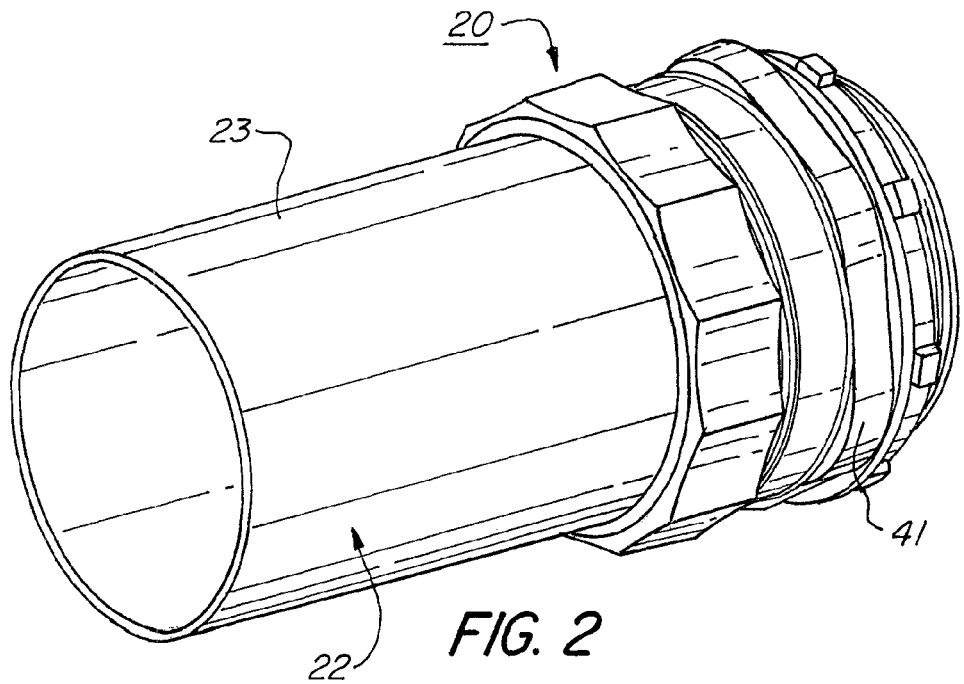
FIG. 2 is a perspective view of an electrical metallic tubing (EMT) or Rigid Metallic Conduit (RMC) inserted into the raintight compression connector shown in FIG. 1.

As seen in FIG. 1, an embodiment of a raintight compression connector 20 according to the present invention is configured for receipt of an electrical metallic tubing or rigid metallic conduit (EMT or RMC) 22 (collectively referred to as conduit) so as to form a raintight seal between the EMT or RMC and an electrical enclosure 24 to which the compression connector is attached through a knockout hole (see, for example, knockout hole 39). Such a raintight compression connector is typically used in applications where the electrical enclosure 24 is exposed to water, such as an outdoor environment where rain is present from time to time. It is known in the art that RMC is similar to EMC, but has a greater wall thickness and is therefore typically used in heavy-duty applications.

FIGS. 1-6 show the components of the raintight compression connector. These components include a connector body 32 having a first portion 47 and a second portion 49 and a bore 33 extending through the first portion and the second portion. The raintight compression connector also includes a gland nut 26, a split compression ring 28, an upper sealing ring 30, as well as a knockout gasket 34, a locknut 36 and a wedge-shaped sealing ring 38. The connector body, gland nut and locknut are typically fabricated from a die cast zinc alloy.

Other materials and fabrication techniques could be used as known to those skilled in the art.

Figure 4:
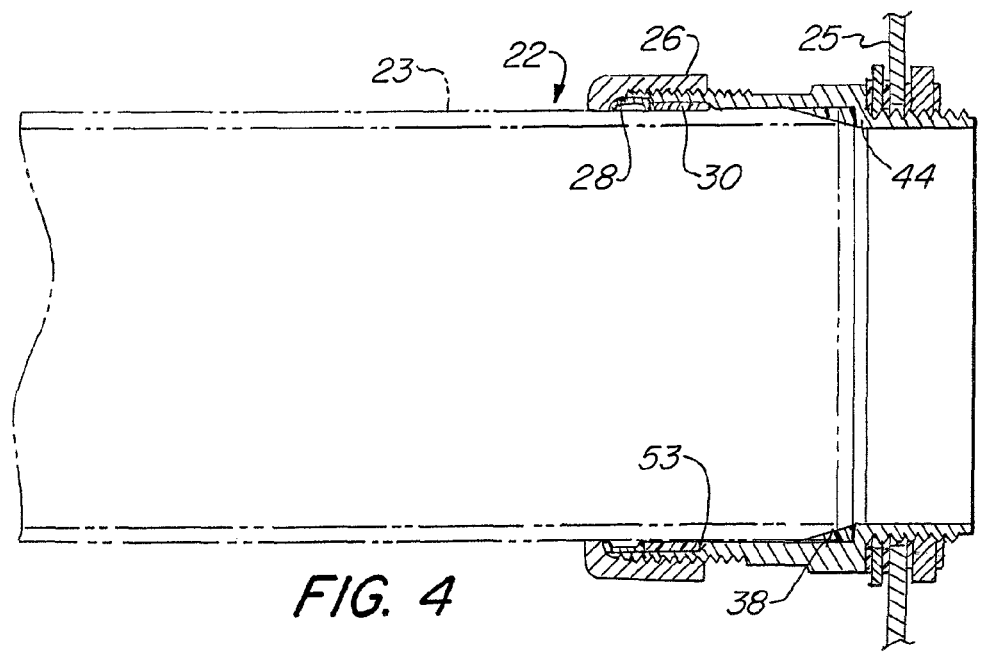
FIG. 4 is a cross-sectional view of the raintight compression connector taken along line 4-4 of FIG. 3.
Figure 5:
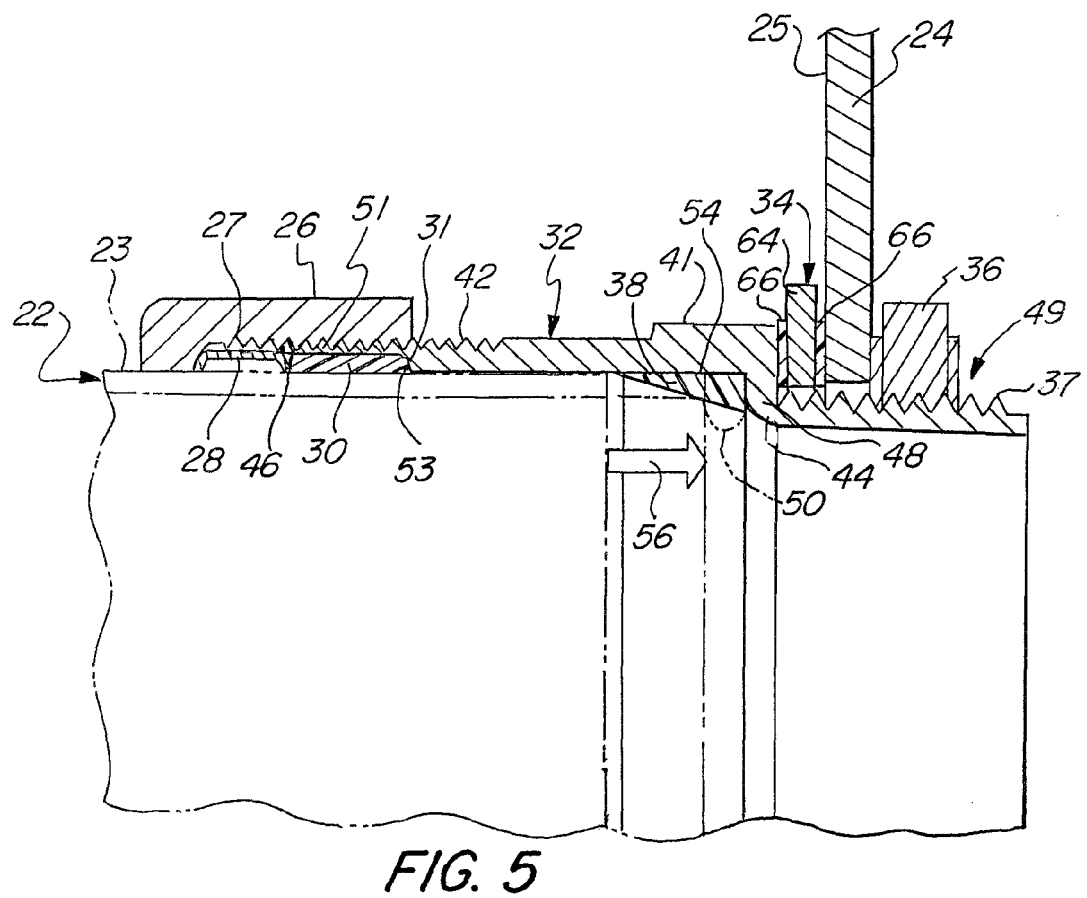
FIG. 5 is an enlarged cross-sectional view of the raintight compression connector shown in FIG. 4 illustrating how the EMT or RMC is advanced in the direction shown by an arrow so as to contact a wedge-shaped sealing seal.

The split compression ring 28 and upper sealing ring 30 are dimensioned to be secured against an outer surface 23 of EMT or RMC 22 as best seen in FIGS. 4 and 5. The split compression ring is typically manufactured from zinc plated spring steel while the upper sealing ring is typically manufactured from thermoplastic, such as polyethylene or polypropylene. Thus, the gland nut has threads 27 that interfit with threads 42 formed at a first end 46 of first end portion 47. The gland nut when threaded onto threads 42 compresses the split compression ring 28 which in turn presses against edge 43 of upper sealing ring 30, thereby urging a tapered edge 31 of upper sealing ring 30 into contact with the interior of first portion 47 along a cutout region 51 thereof and against recess shoulder 53 formed in first end portion 47. This urging of the upper sealing ring against recess shoulder 53 causes the upper sealing ring to press against both first portion 47 and outer surface 33 of EMT or RMC 22. This is best seen in FIGS. 4 and 5. This arrangement of components allows the raintight compression connector to easily accommodate the allowed nominal variations in outer diameters of conduit 22, as well as variations in the outer surface conditions of the conduit and out-of-round conditions of the conduit (that may result from clamping the conduit, dropping the conduit, etc.), while maintaining a sealed relationship between the raintight compression connector and the conduit. Such an arrangement is found in applicant's U.S. Pat. No. 7,390,027.

Although upper sealing ring 30 forms a primary seal to block the intrusion of water, it has been discovered that this primary seal may still allow some water entry beyond the seal region, which as discussed below is remedied by a wedge-shaped sealing ring 38 according to the present invention.

Thus, it has been discovered that especially for larger diameter EMT or RMC, such as 3½" to 4" diameter EMT or RMC, the tolerance limits of conventional raintight compression connectors may allow for water entry into the connector. As best seen in FIG. 5, the present invention uses a wedge-shaped sealing ring 38 positioned adjacent shoulder (conduit stop) 44, of connecting body 32 to overcome this problem. The shoulder is formed in the first portion 47 of connector body 32 at second end 48 thereof.

Figure 6:
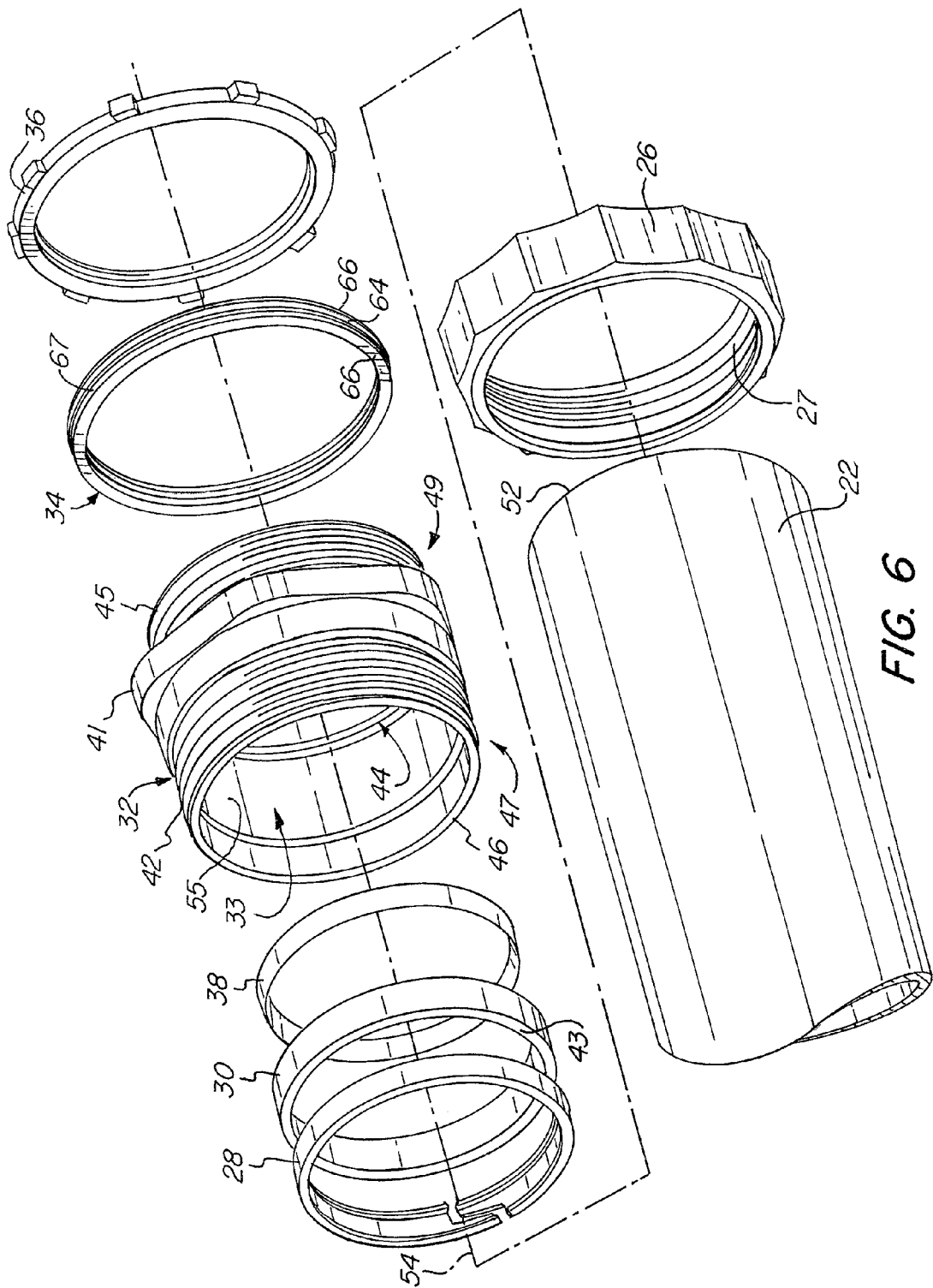
FIG. 6 is an exploded perspective view of the components of the raintight compression connector.
Figure 7:
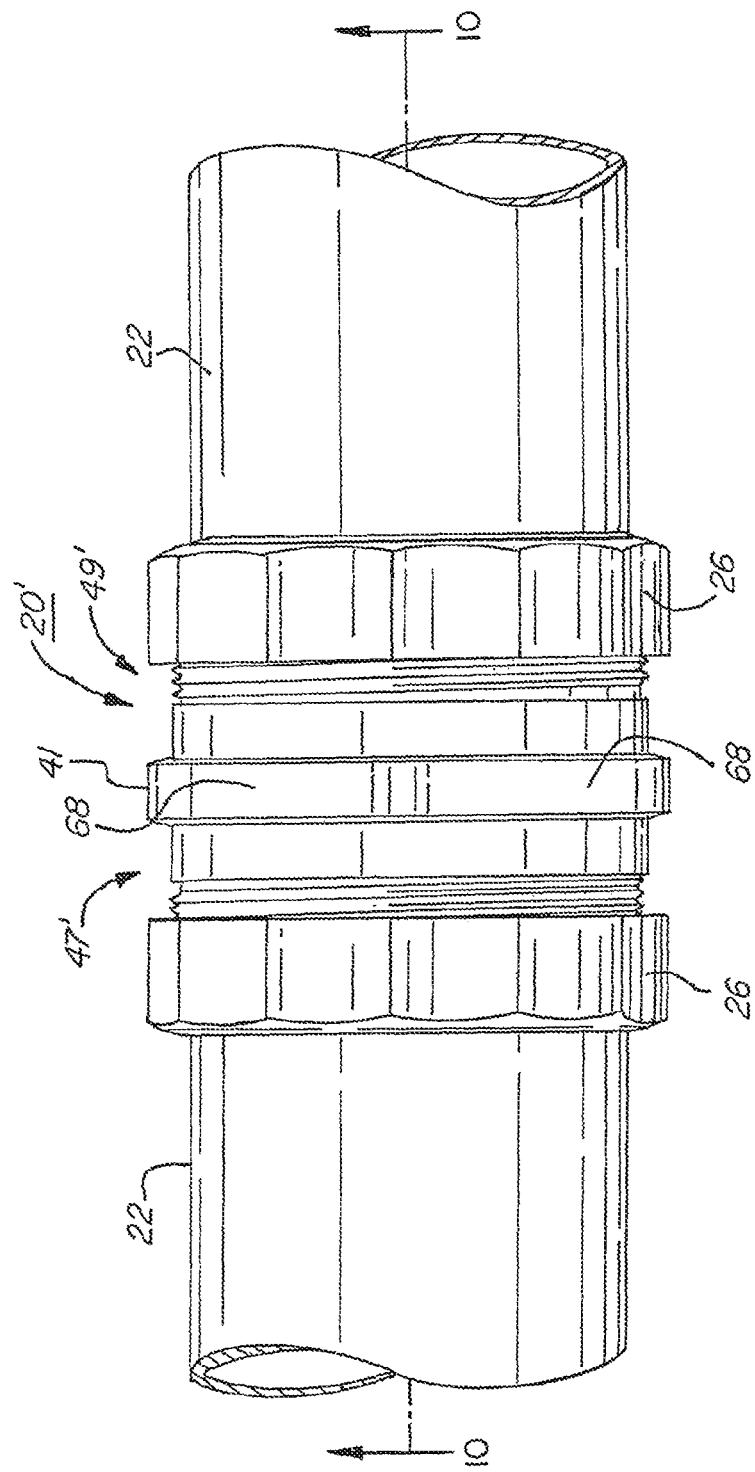
FIG. 7 is a side view of a raintight compression coupler according to an embodiment of the present invention, the coupler attached to two EMT's or RMC's.

As seen in FIG. 6, the conduit 22 is thus inserted into an open end 46 of connector body 32 until it engages with the wedge-shaped sealing ring 38. Arrow 56 shown in FIG. 5 illustrates the direction of movement of the conduit so that it presses into and forms a seal with the sealing ring 38 when the conduit is pressed into the sealing ring against shoulder 44. Shoulder 44 is sometimes referred to as a conduit stop. The wedge-shaped sealing ring is dimensioned to thereby form a slight annular bulge 50 as shown in phantom in FIG. 5, thereby forming a watertight seal with conduit terminating face 52. Because the wedge-shaped sealing ring is pliable in nature, it can accommodate slight diameter tolerance variations for EMT or RMC 22, out-of-round conditions of the conduit, and especially can accommodate the terminating face 52 of the EMT or RMC being slightly skewed (not at right angle) relative to the longitudinal axis 54 of the EMT or RMC (see FIG. 6). Such skewing of the terminating face 52 can occur in the field when EMT or RMC is cut by hand. Thus, the wedge-shaped sealing ring forms a secondary seal to prevent water intrusion into bore 33 of conduit 22.

The wedge-shaped sealing ring may be molded from silicone or other pliable material, such as ethylene propylene diene monomer (EPDM) class synthetic rubber. Other types of elastomer synthetic rubber or other pliable material may of course be used. The wedge-shaped sealing ring can be secured to shoulder 44 of connector body 32, as well as to the inner peripheral wall 55 of the connector body by use of a cyanoacrylate type glue or a silicone-based adhesive. Other means, including the use of other types of adhesives, for securing the sealing ring to the connector body would of course be apparent to those skilled in the art. It can also be seated against shoulder 44 and inner peripheral wall 55 without the use of an adhesive, such as by frictional contact.

Figure 3:
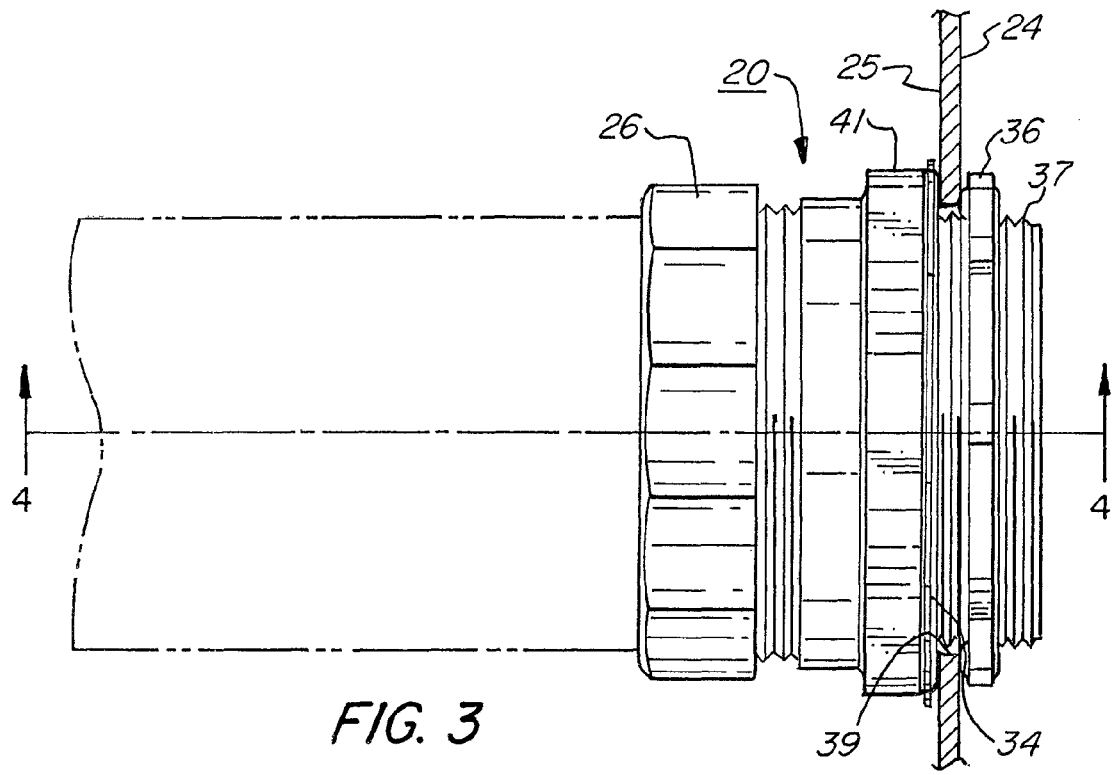
FIG. 3 is a side view of the raintight compression connector shown in FIG. 2.

FIGS. 3, 4, and 5 show how the raintight compression connector 20 is secured to an electrical enclosure 24 or other type of electrical housing or connecting body. Thus, knockout gasket 34 is compressed against the exterior of the electrical enclosure outer wall surface 35 by threaded engagement of locknut 36 with threads 37 formed in the second end portion 49 of connector body 32. This arrangement thereby pulls an outer flange 41 of connector body 32 against knockout gasket 34, which in turn forms a raintight seal against outer wall surface 35 of electrical enclosure 24. Outer flange 41 may have a multi-sided configuration with flat portions 68 to facilitate gripping during installation. Knockout gasket 34 typically is formed from a steel washer 64 having faces 67, with a pliable material 66 molded to at least a portion of both faces 67. The pliable material can be polyethylene, for example.

Figure 8:
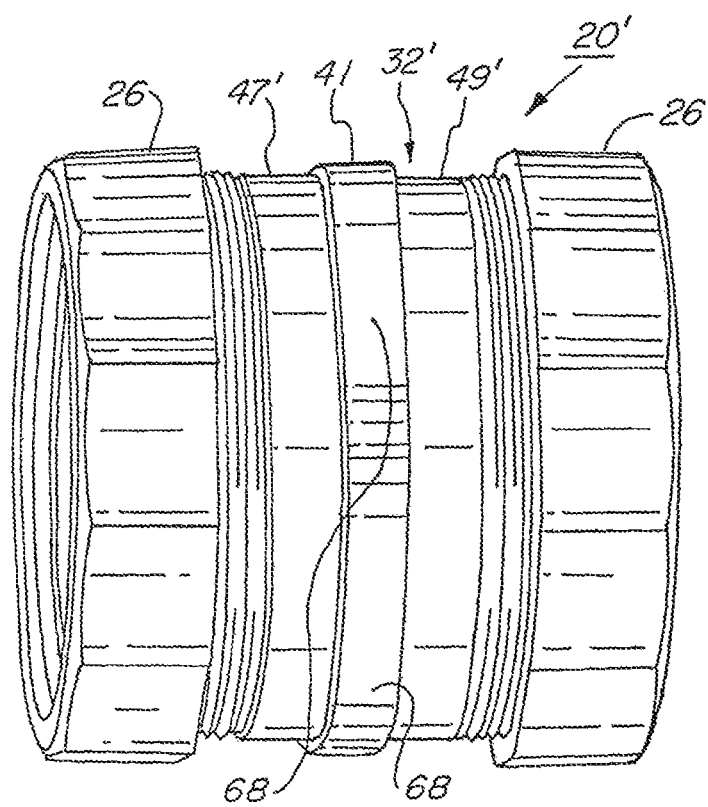
FIG. 8 is a perspective view of the raintight compression coupler shown in FIG. 7 without the EMTs or RMC's attached.
Figure 9:
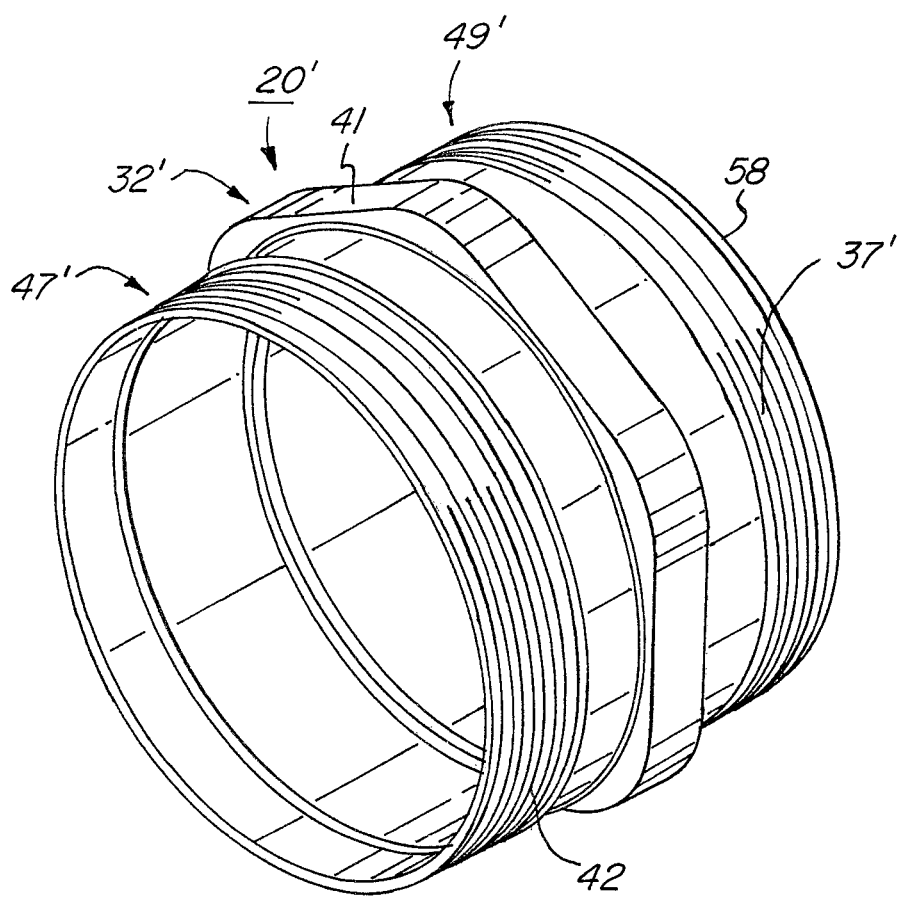
FIG. 9 is a perspective view of the raintight compression coupler without the gland nuts attached.

FIGS. 7-10 show another embodiment of the present invention directed to a raintight compression coupler 20'. The coupler is for connection to two EMTs or RMC's 22. FIG. 8 shows that the coupler has a first portion 47' corresponding to first portion 47 of raintight compression connector 20. Second portion 49' is the mirror image of first portion 47'. Flange 41' is positioned at the junction of first portion 47' and second portion 49'. It has a multi-sided configuration with flat portions 68 to facilitate gripping during installation. As seen in FIG. 10, raintight compression coupler 20' has a split compression rings 28, upper sealing rings 30, and wedge-shaped sealing rings 38 corresponding to those components for raintight compression connector 20, with corresponding components for both first portion 47' and second portion 49'. Shoulder (conduit stop) 44 is at the second end 48' of first portion 47' and at second end 60 of second portion 49'. The wedge-shaped sealing rings for the first and second portion 47' and 49' are positioned against this shoulder and secured to connector body 32' typically by use of a cyanoacrylate type glue or silicone-based adhesive. Although one shoulder is shown, two separate shoulders with a space therebetween could be used. Second external threads 37' are formed in second portion 49' at first end 58 thereof.

Each conduit 22 is therefore secured to raintight compression coupler 20' in the same manner as conduit 22 is secured to raintight compression connector 22. For both connector 20 and coupler 20', a raintight securement of an EMT or RMC is achieved in a manner that accommodates tolerance variations in the outer diameter of the EMT or RMC, variations in outer surface conditions of the EMT or RMC, out-of-round conditions of the EMT and skewed terminating face conditions of the EMT or RMC.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A raintight compression connector comprising:
    a connector body having a first portion and a second portion and a bore extending through the first portion and the second portion, the first portion dimensioned for receipt of a conduit in said bore, the first portion having a first end and a second end;
    a gland nut having internal threads dimensioned for threaded engagement with first external threads formed in the first portion at the first end;
    a split compression ring dimensioned for contact with the gland nut so as to secure the gland nut and the first portion of the connector body to the conduit when the conduit is inserted into the first portion;
    an upper sealing ring dimensioned for contact with the first portion of the connector body so as to make sealing contact with the conduit when the conduit is inserted into the first portion; and
    a wedge-shaped sealing ring positioned in the bore of the first portion against a shoulder formed in the first portion at the second end thereof, said wedge-shaped sealing ring having a tapered surface that faces toward itself and extending from the shoulder where the wedge-shaped sealing ring has a maximum cross-sectional width, toward the first end of the first portion, where the wedge-shaped sealing ring has a minimum cross-sectional width, the tapered surface of the wedge-shaped sealing ring dimensioned to contact a terminating face of the conduit so as to pliably deform around the conduit terminating face so as to form a watertight seal between said conduit terminating face and the shoulder;
    wherein the connector body has an outer flange and wherein the second portion of the connector body is dimensioned for receipt of a knockout gasket, the second portion having second external threads dimensioned for receipt of a locknut for securing the knockout gasket positioned around a knockout hole in an electrical enclosure between said outer flange and the electrical enclosure, thereby forming a raintight seal therewith.

2. The raintight compression connector according to claim 1, wherein the wedge-shaped sealing ring is glued to the shoulder.

3. The raintight compression connector according to claim 2, wherein the wedge-shaped sealing ring is further glued to an inner peripheral wall of the first portion of the connector body.

4. The raintight compression connector according to claim 1, wherein the wedge-shaped sealing ring is glued to an inner peripheral wall of the first portion of the connector body.

5. The raintight compression connector according to claim 1, wherein the wedge-shaped sealing ring is seated against the shoulder and an inner peripheral wall of the first portion of the connector body.

6. The raintight compression connector according to claim 1, wherein the wedge-shaped sealing ring is formed from an elastomeric material.

7. The raintight compression connector according to claim 1, wherein the split compression ring is formed from spring steel.

8. The raintight compression connector according to claim 1, wherein the upper sealing ring is formed from polyethylene.

9. The raintight compression connector according to claim 1, wherein the outer flange has flat portions dimensioned for gripping.

10. The raintight compression connector according to claim 1, wherein the connector body is fabricated from a die cast zinc alloy.

11. The raintight compression connector according to claim 1, wherein the knockout gasket is formed from a washer having two faces, with a pliable material on at least a portion of both faces.

12. A raintight compression coupler comprising:
    a connector body having a first portion and a second portion and a bore extending through the first portion and the second portion, the first portion dimensioned for receipt of a first conduit in said bore, the first portion having a first end and a second end and the second portion dimensioned for receipt of a second conduit in said bore, the second portion having a first end and a second end;
    a first gland nut having internal threads dimensioned for threaded engagement with first external threads formed in the first portion at its first end;
    a first split compression ring dimensioned for contact with the first gland nut so as to secure the first gland nut and the first portion of the connector body to the first conduit when the first conduit is inserted into the first portion;
    a first upper sealing ring dimensioned for contact with the first portion of the connector body so as to make sealing contact with the first conduit when the first conduit is inserted into the first portion; and
    a first wedge-shaped sealing ring positioned in the bore of the first portion against a shoulder formed at the second end of the first portion, said first wedge-shaped sealing ring having a tapered surface that faces toward itself and extending from the shoulder where the first wedge-shaped sealing ring has a maximum cross-sectional width, toward the first end of the first portion, where the first wedge-shaped sealing ring has a minimum cross-sectional width, the tapered surface of the first sealing ring dimensioned to contact a terminating face of the first conduit so as to pliably deform around the first conduit terminating face so as to form a watertight seal between said first conduit terminating face and the first shoulder;
    a second gland nut having internal threads dimensioned for threaded engagement with second external threads formed in the second portion at its first end;
    a second split compression ring dimensioned for contact with the second gland nut so as to secure the second gland nut and the second portion of the connector body to the second conduit when the second conduit is inserted into the second portion;
    a second upper sealing ring dimensioned for contact with the second portion of the connector body so as to make sealing contact with the second conduit when the second conduit is inserted into the second portion; and a second wedge-shaped sealing ring positioned in the bore of the second portion against a shoulder formed at the second end of the second portion, said second ring having a tapered surface that faces toward itself and extends from the shoulder where the second wedge-shaped sealing ring has a maximum cross-sectional width, toward the first end of the first portion, where the second wedge-shaped sealing ring has a minimum cross-sectional width, the tapered surface of the second wedge-shaped sealing ring dimensioned to contact a terminating face of the second conduit so as to pliably deform around the second conduit terminating face so as to form a watertight seal between said second conduit terminating face and the shoulder.

13. The raintight compression coupler according to claim 12, wherein the shoulder formed at the second end of the first portion and the shoulder formed at the second end of the second portion is the same shoulder.

14. The raintight compression coupler according to claim 12, wherein the first wedge-shaped sealing ring is glued to the shoulder formed in the first portion and wherein the second wedge-shaped sealing ring is glued to the shoulder formed in the second portion.

15. The raintight compression coupler according to claim 14, wherein the first wedge-shaped sealing ring is further glued to an inner peripheral wall of the first portion of the connector body and the second wedge-shaped sealing ring is further glued to an inner peripheral wall of the second portion of the connector body.

16. The raintight compression coupler according to claim 12, wherein the first wedge-shaped sealing ring is glued to an inner peripheral wall of the first portion of the connector body and the second wedge-shaped sealing ring is glued to an inner peripheral wall of the second portion of the connector body.

17. The raintight compression coupler according to claim 12, wherein the first wedge-shaped sealing ring is seated against the shoulder formed in the first portion and wherein the second wedge-shaped sealing ring is seated against the shoulder formed in the second portion.

18. The raintight compression coupler according to claim 12, wherein the first and second wedge-shaped sealing rings are formed from an elastomeric material.

19. The raintight compression coupler according to claim 12, wherein the first and second split compression rings are formed from spring steel.

20. The raintight compression coupler according to claim 12, wherein the first and second upper sealing rings are formed from polyethylene.

21. The raintight compression coupler according to claim 12, further comprising an outer flange positioned about the connector body, said outer flange dimensioned for gripping.

22. The raintight compression coupler according to claim 21, wherein the outer flange has flat portions dimensioned for gripping.

23. The raintight compression coupler according to claim 12, wherein the connector body is fabricated from a die cast zinc alloy.

* * * * *